United States Patent [19]

Crofts et al.

[11] Patent Number: 4,465,717
[45] Date of Patent: Aug. 14, 1984

[54] ASSEMBLY FOR MARKING ELONGATE OBJECTS

[75] Inventors: David Crofts, Cirencester; David E. Barnwell, Highworth, both of England

[73] Assignee: Raychem Limited, London, England

[21] Appl. No.: 189,147

[22] Filed: Sep. 22, 1980

[30] Foreign Application Priority Data

Oct. 1, 1979 [GB] United Kingdom ............... 7933950

[51] Int. Cl.³ ........................... G09F 3/10; C09G 7/02
[52] U.S. Cl. ........................................ 428/40; 428/43; 428/202; 428/200; 428/347; 428/354; 428/913; 174/DIG. 8; 427/208.6; 427/208.8; 40/2 R; 40/316
[58] Field of Search ................... 428/40, 43, 345, 346, 428/347, 349, 354, 913, 200, 201, 202; 427/208.8, 208.4, 208.6, 208.2; 264/230; 174/DIG. 8; 40/2 R, 316

[56] References Cited

U.S. PATENT DOCUMENTS 2,975,091  3/1961  Tobey .......................... 428/347 X
3,770,556 11/1973 Evans et al. ..................... 264/230 X
3,881,041  4/1975  Glienke ......................... 428/200 X
3,894,731  7/1975  Evans .
4,214,024  7/1980  Jacobson ........................ 428/43 X Primary Examiner—Alexander Thomas
Attorney, Agent, or Firm—Lyon & Lyon

[57] ABSTRACT

An assembly for marking an elongate object, for example a wire or cable, comprises a flexible heat-recoverable marker strip (1) having one surface which is capable of receiving printed characters, and being supported on a rigid carrier strip to prevent premature recovery of the marker strip when heated, for example when heated to render the printed characters indelible. The assembly is characterized in that the other surface of the marker strip (1) is at least partly coated with a heat-activatable adhesive (2), and is provided with one or more areas of pressure-sensitive or contact adhesive (3) capable at least temporarily of securing the marker strip in position about the object after separation from the carrier strip, and preferably also capable of supporting the marker strip on the carrier strip before separation of the marker strip therefrom.

4 Claims, 4 Drawing Figures

ASSEMBLY FOR MARKING ELONGATE OBJECTS

This invention relates to assemblies for marking elongate objects, especially elongate electrical objects such as wires and cables, and to a method of marking such objects.

There is often a need for identifying components in complex assemblies. This is particularly so in the case of complex electrical assemblies where wires and cables need to be identified. Hitherto, wires and cables in electrical assemblies have been identified by impressing identifying characters into the insulation of the electrical conductors, an expedient which risks impairment of insulative integrity of the wire or cable. More recently it has been proposed to impress or print identifying information onto plastics tubes which are then slipped over the ends of the wires, or, where it has been necessary to identify cables of relatively large diameter, to print information onto a tag which is then attached to the cable by means of a plastics clip or so called tie-wrap. These methods however, suffer from the disadvantage that they cause the diameter of the wire or cable to be increased abruptly in the region where it is identified and that the marker is not secured tightly to the wire or cable with the result that the marker may inadvertantly be moved along the wire or cable or even damaged when the wire or cable is handled.

In order to overcome these problems it has been proposed to produce markers in the form of heat-recoverable sleeves that can be printed with information, slipped over a free end of the wire and heated to shrink the sleeve down onto the wire (see U.S. Pat. No. 3,894,731). While this proposal allows the application of a secure marker having a low profile to the wire, it requires a free end of the wire to be accessible which is often not the case, for example where the wire is already installed.

The present invention provides as assembly for marking an elongate object, especially for marking a wire or cable, which comprises a flexible heat-recoverable marker strip, one surface of which is capable of receiving printed characters and the other surface of which is at least partly coated with a heat-activatable adhesive, the marker strip being supported on a rigid carrier strip to prevent premature recovery of the strip when heated and being provided with areas of pressure sensitive or contact adhesive capable at least temporarily of securing the marker strip in position about the object after separation from the carrier strip.

By "heat-activatable adhesive" used herein there is meant any adhesive which exhibits little or no adhesive properties when contacted with a substrate at ambient temperature but which will adhere to the substrate at ambient temperature after the temperature of the adhesive has been raised to activate it. Such adhesives include so-called hot-melt adhesives and heat-reactivatable adhesives and one component curing adhesives.

The marking assembly according to the invention may be used to identify an object such as a wire or cable by applying printed information to the marker strip, for example by means of a typewriter, separating a portion of the marker strip from the remainder of the marker strip and from the carrier strip, securing the portion of marker strip in position about the article and applying heat to the said portion, for example by means of a hot-air gun or a gas torch, in order to activate the heat-activatable adhesive thereby fixing the portion of marker strip on the object and causing the marker strip to recover.

A preferred form of assembly according to the invention is one in which the marker strip is supported on the carrier strip by the pressure sensitive or contact adhesive. It is also preferred for the marker strip to be a continuous strip. In this assembly a portion of marker strip may be severed from the remainder of the marker strip together with a portion of the carrier strip and subsequently separated therefrom or a portion of the marker strip may be first separated from the carrier strip and then severed from the remainder of the marker strip.

The marking assembly according to the invention has the advantage that it is possible to provide electrical equipment such as electrical cables with identifying markers that stand out from the cable only to a very slight extent and are accordingly less liable to be damaged, for example by catching on other objects, when the cable is handled. In addition, the marker is securely attached to one part of the cable so that there is no risk of the marker sliding along the cable during handling, and the fact that the marker is wrapped around the cable allows cables to be marked even though the ends of the cable are inaccessible. In addition where the preferred marker assembly is used, the point at which the marker strip is severed can be varied at will, depending on the size of the cable to be marked, so that a single marker assembly will suffice to mark cables of widely differing diameter.

As stated above, the marker strip used in the assembly according to the invention is a heat-recoverable strip. Heat-recoverable articles are articles that have been changed from an original heat-stable configuration to a dimensionally heat-unstable configuration. Such an article will revert, or attempt to revert, to its original heat-stable configuration on the application of heat alone. Examples of such heat-recoverable articles are found in U.S. Pat. Nos. 2,027,962, 3,086,242 and 3,721,749 the disclosures of which are incorporated herein by reference.

One method of making a heat-recoverable article involves the formation of a polymeric article followed by crosslinking of the polymer. The crosslinking can be effected by chemical means e.g. with peroxides, or by irradiation or a combination of the two. Radiation employed can be of various types including charged particles e.g. alpha or particles or high energy electrons and electromagnetic radiation e.g. gamma or ultraviolet radiation. Subsequent heating of the material will melt the crystals in the crystalline thermoplastic material or significantly lessen other internal molecular forces to an exert sufficient to allow distortion of the article. Upon cooling of the heated and distorted article, there is obtained a product which remains in its distorted shape while at room temperature due to the reformation of strong interchain forces such as crystallinity. Upon reheating, the crosslink forces become dominant and the material tends to recover to its original geometry.

When irradiation is used, doses of any desired amount can be used although, generally, a dosage of from 5 to 50, preferably 10 to 20 Mrads will be sufficient.

Examples of polymeric materials that may be used to form the marker strip include polyolefins e.g. polyethylene and ethylene copolymers for example with propylene, butene, vinyl acetate or ethyl acrylate, polyvinyl chloride, polyvinylidene flouride, elastomeric materials such as those described in U.K. Specification No. 1,010,064 and blends such as those disclosed in U.K. Specification Nos. 1,284,082 and 1,294,665, the disclosures of which are incorporated herein by reference. Preferably the marker strip is formed from a polyolefin or a blend of polyolefins, and especially it comprises polyethylene.

For good printability, the polymeric material from which the marker strip is formed contains a substantial proportion of filler. One preferred marker strip material contains 40 parts by weight low density polyethylene, 15 parts by weight ethylene-ethylene acrylate copolymer, 8 parts by weight pigment, 31 parts by weight flame retardant and 6 parts by weight antioxidant. The recovery temperature of such a material is about 105° to 110° C.

The use of a heat-recoverable material for the marker strip has the advantage that the marker strip can be positioned about the object with a loose fit, thereby facilitating application of the strip to the object, and then shrunk onto the object by the application of heat so that the strip fits securely onto the object. In addition, the forces that are exerted on the object by the marker strip as it shrinks down aid, to a certain extent, the adhesion due to the hot-melt adhesive. Usually the method of manufacture of the marker strip is designed such that the strip will recover on heating to a length of from 50 to 90% of its expanded length.

The marking assembly may be marked with printed information in a simple manner by means of a conventional typewriter. Essentially, the only modification that is needed to the typewriter is that an indentation should be cut in the hard rubber surface of the platen to receive the assembly and to position it for presentation to the typewriter keys. Preferably the carrier strip extends beyond at least one of the lateral edges of the marker strip to enable engagement with a drive wheel, and more preferably the exposed edge of the carrier strip is provided with a series of perforations for receiving the teeth of a sprocket wheel located on the typewriter platen in order to ensure correct movement and alignment of the marker assembly through the typewriter.

One problem that is associated with printing information on markers by means of a typewriter is that the characters applied to the marker are not initially permanent and therefore have to be rendered indelible by a further operation. According to U.S. Pat. No. 3,894,731 this is achieved by exposing the printed marker sleeves to an infrared radiation source for example a quartz tungsten filament lamp for a short period of time during which the temperature of the print portions of the sleeves is believed to be raised to a temperature of about 315° C.

It will be appreciated, however, that difficulties arise when the heat-recoverable marker is in the form of a strip since the strip will be heated by the infra-red radiation and will tend to recover to its original heat-stable configuration. This difficulty is overcome according to the present invention by providing the heat-recoverable marker strip with a carrier strip that is sufficiently rigid to hold the marker strip in its expanded state against forces that may be caused by any tendency of the marker strip to recover prematurely. It has been found that the bond between the marker strip and the carrier strip provided by the pressure sensitive adhesive is sufficiently strong to resist the recovery forces of the marker strip (since this is dependent on the sheer strength of the bond) while being sufficiently weak to allow easy removal of the marker strip from the carrier strip (since this is dependent on the peel strength of the bond). Advantageously, where perforations are provided along the edge of the carrier strip, the perforations may also be used in conjunction with a further sprocket wheel for moving the assembly past the infra-red radiation source.

Since the assembly is intended to be exposed to an infra-red radiation source to render the typewritten characters indelible, the carrier strip material should be sufficiently resistant to heat generated by the radiation source. Examples of possible carrier strip materials include polyamides (nylon), polyethylene terephthalate, fluorinated ethylene propylene copolymers, ethylene-propylene-tetrafluoroethylene copolymers and polypropylene. The thickness of the carrier material is advantageously in the range of from 0.2 to 0.6 mm.

Hot-melt adhesives that may be used in the assembly according to the invention include adhesives based on ethylene-vinyl acetate, ethylene-ethyl acrylate or blends thereof, polyamides and polyesters. Care should be taken to match the type of adhesive with the marker strip material used so that adequate bonding between the two is obtained. Thus, for example, when a polyolefin is used as the marker strip material, an ethylene-vinyl acetate adhesive is suitable. Similarly, where the marker strip material is based on a segmented polyester, for example, as commercially available under the trade name "Hytrel", from DuPont a polyester hot-melt adhesive is preferred. Heat-reactivatable adhesives that may be used as the heat-activatable adhesive are preferably rubber-based e.g. those based on acrylonitrile and chloroprene rubber (particularly with medium to high crystallisation rates), a polyurethane rubber, or a polybutylmethacrylate preferably containing a delayed action plasticiser such as dicyclohexyl or diphenylphthalate. The heat-activatable adhesive is preferably applied to the whole of one of the surfaces of the marker strip, advantageously with a thickness in the range of from 0.1 to 0.5 mm.

As the one component curing adhesives, curing epoxy adhesives are preferred. For example, a high temperature one component epoxy adhesive is particularly suitable where a temperature material such as fluorocarbon elastomers and blends thereof with polyvinylidene fluoride is used for the marker strip.

Most common pressure-sensitive or contact adhesives may be used in the assembly according to the invention. Among preferred pressure-sensitive adhesives, there may be mentioned rubber based acrylics or thermoplastics, styrene butadiene rubbers, silicones and adhesives based on ethylene-vinyl acetate, most preferably styrene-butadiene thermoplastic block copolymers. Preferably the pressure-sensitive or contact adhesive is applied onto the heat-activatable adhesive in the form of one or more strips, preferably two strips, extending longitudinally along the entire length of the marker strip. The strips are generally 0.05 to 0.25 mm thick and from 5 to 15 mm wide. The strip of pressure sensitive or contact adhesive preferably does not cover the edge of the marker strip since this can, under certain circumstances, weaken the final bond between the marker strip and itself or between the marker strip and the object to be marked.

Alternatively, the heat-activatable adhesive may be applied to the marker strip in a plurality, e.g. three, relatively broad longitudinally extending bands which leave two strips of exposed marker strip surface therebetween, and the pressure sensitive or contact adhesive is applied onto the exposed surface substantially to cover the exposed surface areas between the heat-activatable adhesive.

One form of marking assembly according to the invention will now be described by way of example with reference to the accompanying drawings, in which.

Figure 1:
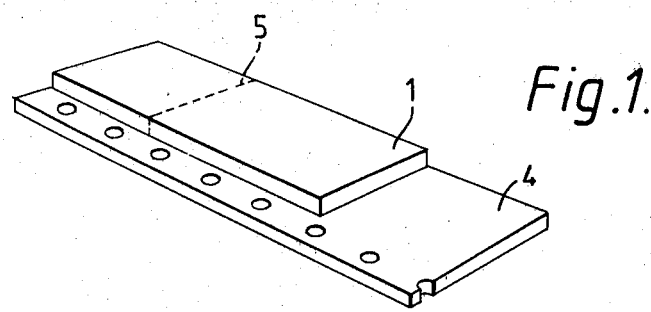
FIG. 1 is a perspective view of a section of marking assembly according to the invention.
Figure 2:
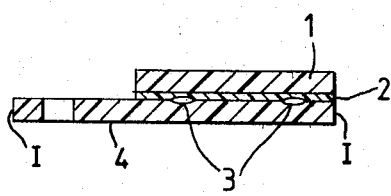
FIG. 2 is a cross-sectional view of the marking assembly shown in FIG. 1.
Figure 3:
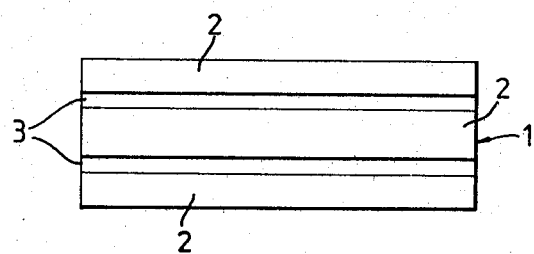
FIG. 3 is a plan view of the assembly with the carrier strip removed taken along the line I—I of FIG. 2.

Referring initially to FIGS. 1 to 3 of the accompanying drawings, a marking assembly comprises a marker strip of heat-shrinkable material 1, 0.5 mm thick having a layer of hot-melt or heat-reactivatable adhesive 2 covering the whole of one surface thereof, and two strips 3 of a pressure sensitive adhesive located on the coat of hot-melt or heat-reactivatable adhesive. The marker strip 1 is formed from a modified, irradiation cross-linked polyolefin that has been extruded as a sheet. After extrusion the sheet is irradiated and then stretched by means of an expander so that it will recover to 75% of its expanded length. The sheet is then coated successively with the hot-melt or heat-reactivatable adhesive 2 and the strips of pressure-sensitive adhesives 3, the whole operation being conducted as a continuous process. The marker strip 1 is then applied onto a nylon carrier strip 4 and the whole assembly is wound onto a spool while applying pressure between the marker strip 1 and carrier strip 4 so that the pressure-sensitive adhesive 2 will form a weak bond between the two.

If desired, the marker strip 1 and optionally the carrier strip 4 as well can be provided with lines of weakness 5, for example score lines or lines of perforations in order to facilitate severing of portions of the marker strip from the remainder of the assembly.

Figure 4:
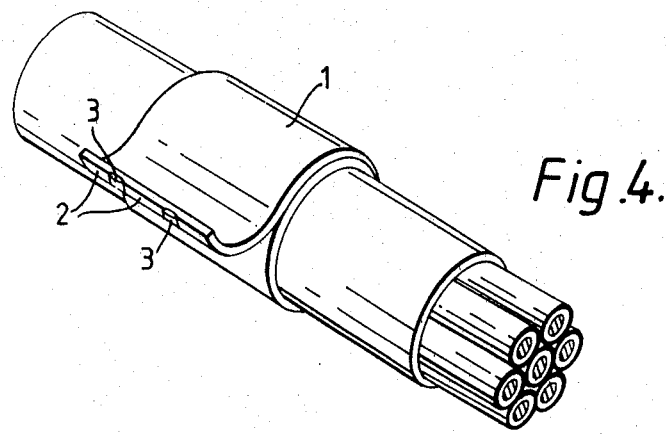
FIG. 4 is a perspective view of a severed portion of marker strip being positioned about a cable.

In order to identify an elongate object, for example a cable by means of the marking assembly, the marker assembly is first fed into a typewriter modified for the purpose, and the identifying information is typed onto the marker strip 1. The marker assembly is suited to cases where a number of different cables in the vicinity of each other need to be marked or where one or more cables needs to be marked in a number of places since the relevant identification can be repeatedly typed onto the marker strip at intervals along its length before portions of the marker strip are severed. After the information has been typed onto the marker strip, the assembly is exposed to an infra-red radiation source in order to render the information on the marker strip 1 indelible. One portion of the marker strip 1 is then severed from the remaining part of the assembly and is peeled off the carrier strip, these operations being performed in either order, and the severed portion of marker strip is then wrapped around the cable as shown in FIG. 4. While it is possible to vary the length of the severed portion to a considerable extent independently of the cable size, it is advantageous for the length of the severed portion to be about twice the circumference of the cable so that when the severed portion is wrapped around the cable, it overlaps itself over almost the whole circumference of the cable thus providing a marker of substantially uniform circumferential thickness.

When the marker strip has been wrapped around the cable, the contact or pressure sensitive adhesive 3 will retain the strip in position temporarily while the strip is heated. The strip is heated by directing hot air from a hot air gun or a flame from a gas torch onto the strip initially in the central region of the overlapping portion so that the strip recovers to a slight extent and the hot-melt or heat-reactivatable adhesive 2 provides a permanent bond between the two layers of the marker strip and/or between the underlying layer of marker strip and the cable.

The following examples illustrate the invention:

EXAMPLE 1

| | |
|---|---|
| Marker Strip | RNF 100 (trade mark) supplied by Raychem 0.5 mm thick |
| Carrier Strip | Nylon 66 0.4 mm thick |
| Heat Activatable Adhesive | Ethylene-ethyl acrylate hot-melt 0.2 mm thick |
| Pressure Sensitive Adhesive | Styrene butadiene block copolymer 0.1 mm thick |

EXAMPLE 2

| | |
|---|---|
| Marker Strip | Segmented polyether-polyester, Raychem Comp. 1336 (trade mark) |
| Carrier Strip | Nylon 66 0.4 mm thick |
| Heat Activatable Adhesive | Polyester S1133 (trade mark) supplied by Raychem |
| Pressure Sensitive Adhesive | Styrene-butadiene block copolymer. 0.1 mm thick |

EXAMPLE 3

| | |
|---|---|
| Marker Strip | Blend of polyvinylidene and a fluorocarbon rubber sold by DuPont under the trade name Viton. |
| Carrier Strip | Nylon 66, 0.4 mm thick |
| Heat Activatable Adhesive | One component epoxy adhesive based on diglycidyl ether of bisphenol A and dicyandiamide |
| Pressure Sensitive Adhesive | Ethylene-vinyl acetate pressure sensitive adhesive. |

We claim:

1. An assembly for marking an elongate object, said assembly comprising:
   (a) a flexible heat-recoverable marker strip which is heat recoverable in the longitudinal direction having a first and second surface, said first surface being capable of receiving printed characters;
   (b) a rigid carrier strip means for releasably supporting said flexible heat-recoverable marker strip and for preventing premature recovery of said marker strip when heated;
   (c) a heat activatable adhesive means covering at least part of said second surface of said flexible heat-recoverable marker strip for providing a permanent bond between said flexible heat-recoverable marker strip and said elongate object; and
   (d) pressure-sensitive adhesive means disposed longitudinally along said second surface of said marker strip for releasably adhering said second surface of said marker strip to said rigid carrier strip and for securing, at least temporarily, said marker strip in position about said elongate object after separation of said marker strip from said rigid carrier strip.

2. As assembly for marking an elongate object, said assembly comprising:
(a) a flexible continuous marker strip which is heat recoverable in the longitudinal direction, said flexible continuous marker strip having a first surface capable of receiving printed characters, said flexible continuous marker strip also having a second surface;
(b) a rigid carrier strip means for releasably supporting said flexible continuous marker strip and for preventing premature recovery of said flexible continuous marker strip when said flexible continuous marker strip is heated for the purpose of fixing print thereon;
(c) a heat activatable adhesive means covering at least a portion of said second surface of said flexible continuous marker strip for providing a permanent bond between said flexible continuous marker strip and the object; and
(d) pressure-sensitive adhesive means disposed longitudinally along said second surface of said flexible continuous marker strip for releasably adhering said second surface to said rigid carrier strip and for securing, at least temporarily, said flexible continuous marker strip in position about the object after said flexible continuous marker strip is separated from said rigid carrier strip.

3. An assembly as set forth in claims 1 or 2, wherein said heat-activatable adhesive is a material selected from the group consisting of a heat-reactivatable adhesive, a hot-melt adhesive or a one component curing adhesive.

4. An assembly as set forth in claim 2, wherein said flexible continuous marker strip is provided with one or more lines of weakness to allow one or more portions thereof to be severed from the remainder thereof.

* * * * *